United States Patent
Schoeninger

(10) Patent No.: US 6,739,185 B2
(45) Date of Patent: May 25, 2004

(54) VEHICLE WHEEL ALIGNMENT METHOD AND TIRE FORCE MEASUREMENT SYSTEM

(75) Inventor: Hilbert E. Schoeninger, Fenton, MI (US)

(73) Assignee: Domion Technologies Group, Inc., Roseville, MI (US)

( * ) Notice: Subject to any disclaimer, the term of this patent is extended or adjusted under 35 U.S.C. 154(b) by 0 days.

(21) Appl. No.: 10/143,244

(22) Filed: May 9, 2002

(65) Prior Publication Data

US 2003/0209061 A1 Nov. 13, 2003

(51) Int. Cl.⁷ .............................................. G01M 15/00
(52) U.S. Cl. ......................................................... 73/146
(58) Field of Search ................................ 73/146, 146.2, 73/118.1, 8

(56) References Cited

U.S. PATENT DOCUMENTS

| | | | |
|---|---|---|---|
| 3,187,440 A | * | 6/1965 | Merrill et al. ............ 33/203.13 |
| 4,498,243 A | | 2/1985 | Kashiwagi |
| 4,679,327 A | | 7/1987 | Fouchey et al. |
| 5,111,585 A | | 5/1992 | Kawashima et al. |
| 5,355,586 A | | 10/1994 | Fukuda et al. |
| 5,467,646 A | * | 11/1995 | Douine et al. ................ 73/126 |
| 5,513,438 A | | 5/1996 | Emmons |
| 5,531,107 A | * | 7/1996 | Ganzhorn, Jr. ................ 73/117 |
| 6,546,635 B1 | * | 4/2003 | Gerdes .................... 33/203.13 |

* cited by examiner

Primary Examiner—Eric S. McCall
(74) Attorney, Agent, or Firm—Harness, Dickey & Pierce, P.L.C.

(57) ABSTRACT

A vehicle wheel alignment method and tire force measuring system is disclosed which enables lateral forces generated by a vehicle tire so that vehicle alignment adjustments may be made to compensate for these as well as other tire generated forces or to enable matching of tires on a given vehicle axle to compensate for such forces. The apparatus provides a pair of tire supporting rollers each of which is supported for independent lateral movement and together are supported for movement in a horizontal plane. In this way, forces resulting from conicity and ply-steer may be measured in addition to the forces from camber and toe in which have been measured in the past. Once the magnitude and direction of these forces has been determined suitable adjustments to the vehicle suspension system may be made so as to net the given force to substantially zero for a given axle.

18 Claims, 8 Drawing Sheets

VEHICLE WHEEL ALIGNMENT METHOD AND TIRE FORCE MEASUREMENT SYSTEM

BACKGROUND AND SUMMARY OF THE INVENTION

The present invention relates to wheel alignment machines for motor vehicles and more specifically to such a machine having the ability to more accurately measure the dynamic forces acting between a vehicle wheel assembly and the surface engaged thereby thus enabling alignment adjustments to more completely compensate for these forces.

In manufacturing and assembly of motor vehicles, wheel alignment quality improvement demands by customers has steadily increased in recent years. Wheel alignment problems may exhibit themselves in various ways such as by the need for the driver to maintain a force on the vehicle steering wheel to maintain straight line tracking of the vehicle, excessive or rapid tire wear or even reduced fuel economy resulting from increased rolling resistance of the tire. Vehicle manufacturers typically have wheel alignment complaints in the top ten of their repetitive warranty problems.

Unfortunately, achieving correct wheel alignment is a very complex problem to resolve due to the wide variety of factors affecting wheel alignment in a given vehicle with a given set of wheel/tire assemblies. These factors include the specific wheel assembly geometry that affect caster, camber, and toe in/toe out of the vehicle. Generally, these are the factors which are and have been measured by current wheel alignment apparatus. However, there are also a number of other factors that contribute significantly to vehicle performance and may vary from one vehicle to the next of identical design. Among these additional factors are the dynamic tire forces such as conicity, and ply-steer which may dramatically influence the handling of a given vehicle. These factors will vary from one tire to the next even when the tires selected for a vehicle may have been manufactured at the same location and time and even using the same tire mold.

Conventional geometrical alignment apparatus utilized by the motor vehicle manufacturers is not able to measure these dynamic tire forces and hence alignment adjustments are not able to be made to compensate for these forces.

Further complicating the problems in achieving proper and accurate wheel/tire alignment on a motor vehicle is the need for any such force measuring apparatus to determine the dynamic forces rapidly so as to accommodate the needs of motor vehicle manufacturers' high speed assembly lines.

The present invention, however, provides apparatus which is well suited for detecting and accurately measuring these dynamic tire forces and, when used in an alignment application, is able to facilitate alignment adjustments to minimize these forces by netting the resultant forces on a given axle to or closely approximating zero.

The present invention comprises an arrangement for supporting a vehicle wheel/tire assembly by means of a pair of rollers, each of which is independently movable laterally with respect to the wheel/tire assembly. Further, the roller assembly is supported on support frame which in turn is movably supported on a base structure to allow relatively free movement of the frame along both an X axis and Y axis so as to thereby enable rotational movement of the support frame about the Z axis. In this regard, it should be noted that throughout this specification, the X axis is considered to correspond to a horizontal axis extending parallel to the motor vehicle longitudinal axis, the Y axis is considered to correspond to a horizontal axis but extending perpendicular to the X axis and the Z axis is a vertical axis extending perpendicular to the plane defined by the X–Y axis.

By supporting the rollers in such a manner so as to allow relatively free independent movement thereof, the dynamic tire forces exerted thereon during rotational movement of the wheel/tire assembly will effect relative movement between the respective rollers as well as between each roller and the wheel/tire assembly. The extent of this movement will provide a measurement of the dynamic tire forces which measurements may then be utilized for tire sorting/matching or when the apparatus is used in an alignment operation, to enable adjustment of the vehicle wheel alignment to achieve a substantially zero net force or some predetermined net force as desired.

Additional advantages and features of the present invention will become apparent from the subsequent description and the appended claims taken in conjunction with the accompanying drawings.

DETAILED DESCRIPTION OF THE PREFERRED EMBODIMENTS

Figure 1:
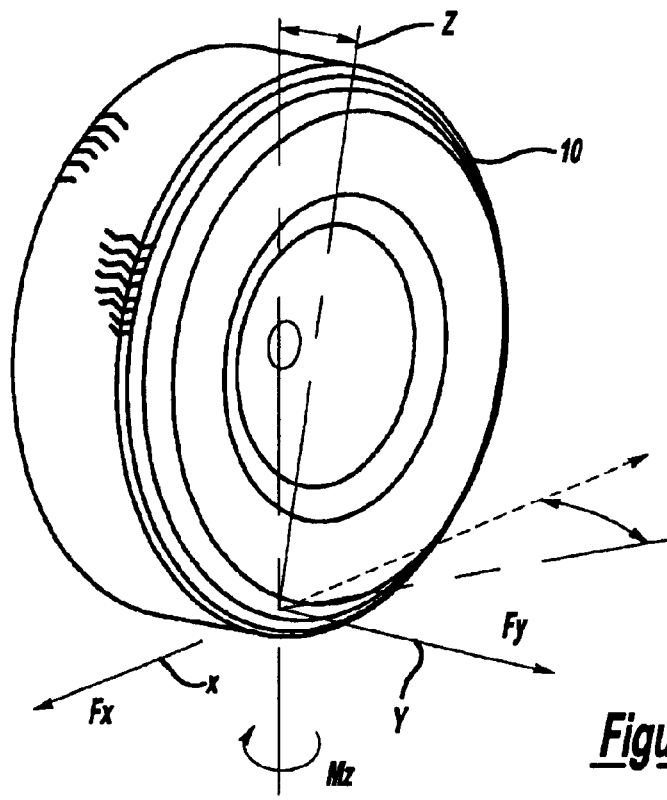
FIG. 1 is a diagrammatic view of a vehicle wheel/tire assembly illustrating the resultant forces that may act thereon and may affect the resulting alignment.

Referring now to the drawings and initially to FIG. 1, there is shown a wheel/tire assembly in which the various forces acting between it and the surface it travels may affect its straight line tracking. As mentioned above, there are numerous forces acting upon a rolling wheel/tire assembly for which adjustments in the alignment may be required to compensate. For example, toe in or toe out may generate a slip angle and result in both a lateral force $F_y$ as well as increased rolling resistance $F_x$ and increased tire wear. However, either or both conicity and ply-steer of the tire may generate a lateral force either one or both of which may add or subtract from the lateral force resulting from a toe in or toe out condition. These latter two forces can also increase the tire's rolling resistance. Additionally, these forces can generate a residual aligning torque $M_z$ about the Z axis. While toe in and camber are commonly measured in conventional alignment equipment, these are only a part of the overall solution in achieving a desired alignment and ensuring minimum steering pull and maximum fuel economy. The present invention, however, enables the lateral forces resulting from these other factors to be measured, and once measured appropriate tire sorting/matching may be used to enable one tire to offset the forces of the other tire on a given axle and/or alignment adjustments can be determined and made so as to more closely approximate or achieve a net lateral force of 0 for a given vehicle axle. That is, the slip angle or toe in and camber (in many vehicles, these are the only adjustments that can be made) can be adjusted such that the lateral forces on a given wheel are minimized and/or are of a magnitude and direction to offset those lateral forces generated by the corresponding wheel/tire assembly on the other side of the vehicle. In this manner, the steering wheel torque required to maintain a straight path on a level roadway will be minimized if not completely reduced to 0 while also minimizing the rolling resistance of the vehicle and thus improving fuel economy.

Figure 2:
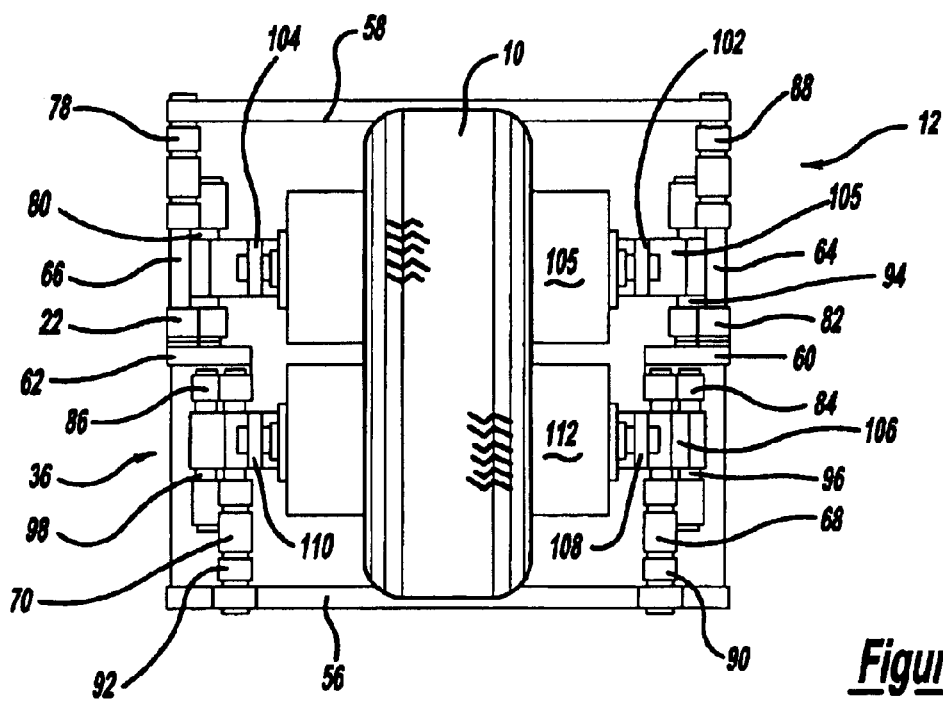
FIG. 2 is a plan view of the tire force measurement apparatus of the present invention with a wheel/tire assembly supported thereon.
Figure 3:
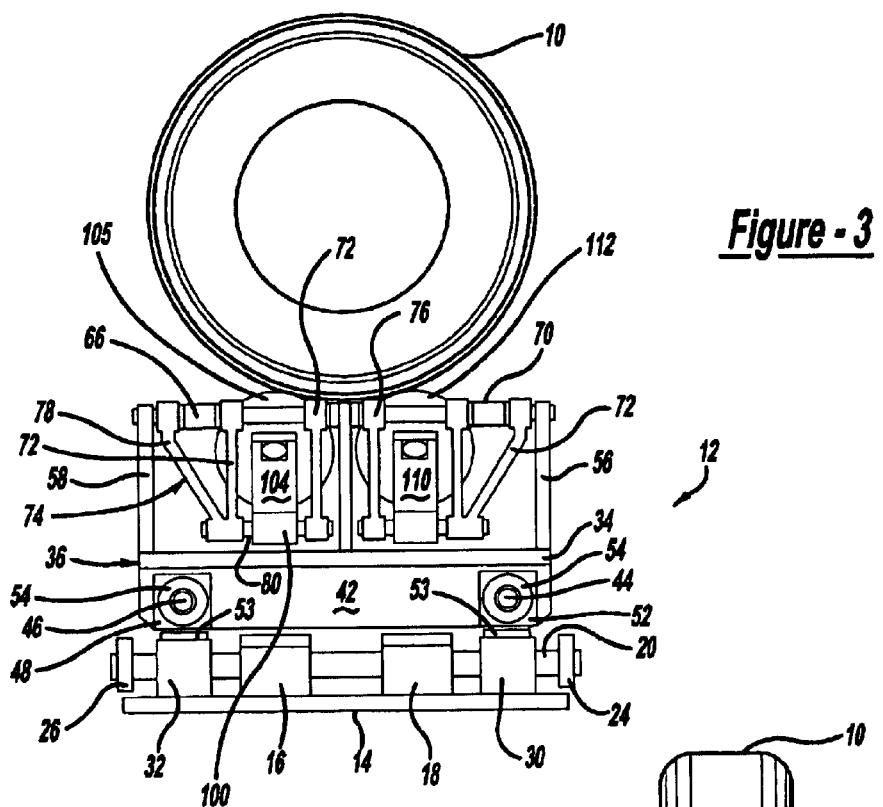
FIG. 3 is a side elevational view of the apparatus shown in FIG. 2.
Figure 4:
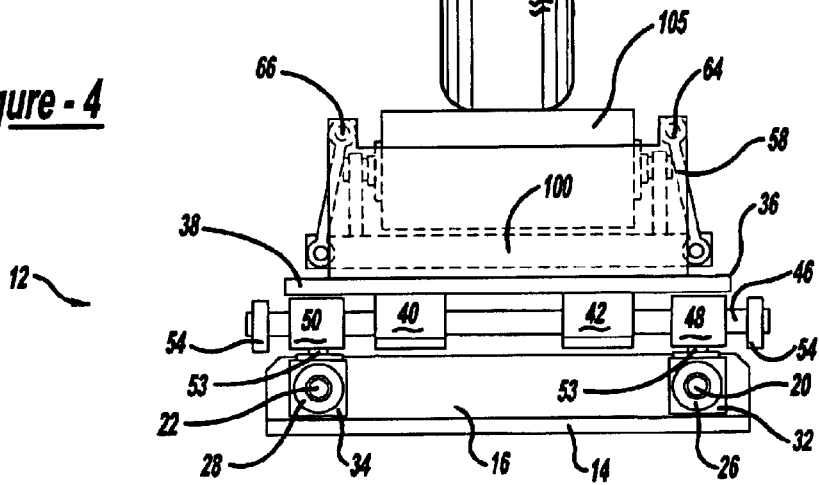
FIG. 4 is a front elevational view of the apparatus shown in FIG. 2.

With reference to FIGS. 2, 3 and 4, a tire force measurement apparatus in accordance with the present invention is shown generally at 12 with a vehicle wheel/tire assembly 10 supported thereon. Tire force measurement apparatus 12 includes a support base 14 to which a pair of substantially identical elongated support blocks 16 and 18 are secured in spaced substantially parallel relationship. Support blocks 16 and 18 each include aligned bores adjacent one end thereof through which elongated shaft 20 extends. In like manner, a second shaft 22 extends through aligned bores provided adjacent the opposite ends of blocks 16 and 18. Shafts 20 and 22 are fixedly secured to and supported by blocks 16 and 18 in spaced substantially parallel relationship to both base 14 and to each other. Stop elements 24 and 26 are secured to opposite ends of shaft 20, and a corresponding pair of stop elements only one 28 of which is shown are secured to opposite ends of shaft 22.

A pair of linear bearing assemblies 30, 32 are movably supported by shaft 20 being positioned between respective stop elements 24, 26 and the adjacent support blocks 16, 18. Similarly, a second pair of linear bearings only one 34 of which is shown are movably supported on shaft 22 in a like position between the outer stop elements and blocks 16, 18.

A roller support frame 36 is also provided which includes a platform 38 having a pair of substantially identical elongated blocks 40, 42 secured to a lower surface thereof in substantially parallel spaced relationship. Blocks 40 and 42 have a longitudinal axis oriented substantially perpendicular to the longitudinal axis of blocks 16 and 18 and also include shafts 44 and 46 extending therethrough adjacent opposite ends thereof. Two pairs of linear bearings 48, 50, 52 (only three of which are shown) serve to movably support shafts 44 and 46 and are each rotatably connected to respective ones of the four linear bearings 30, 32 and 34 (only three shown) provided on shafts 20 and 22. Each of the four rotary connections is provided by a thrust bearing and shaft assembly 53 or any other suitable equivalent arrangement providing a rotational coupling. Each of shafts 44 and 46 has a stop element 54 provided at each outer end thereof and respective ones of the linear bearings are movable along respective shafts 44 and 46 between respective blocks 40, 42 and stops 54.

As may thus be appreciated, the above described support arrangement of roller support frame 36 with respect to base 14 allows relatively free movement therebetween along both an X and Y axis within the confines defined by the associated blocks and stops. Preferably, linear bearings 30, 32, 34, 48, 50, 52 as well as their respective rotatable interconnections will be selected to provide extremely low friction free movement therebetween as well as along shafts 20, 22, 44 and 46 so as to provide a relatively free floating support for frame 36 and thus minimize the effect of frictional forces in the measurement of the dynamic wheel/tire forces. It should be noted that, if desired, roller support frame 36 may be supported by a plurality of spherical rollers in what is generally termed a floating plate arrangement. However, suitable constraints would be required to limit the free floating displacement of roller support frame 36 in such a construction.

Platform 38 also includes a first pair of elongated upstanding flange members 56, 58 secured along opposite lateral edges thereof and extending in generally parallel relationship to shafts 44 and 46. Additionally, a second pair of upstanding support flanges 60, 62 are provided on platform 38 approximately midway between flanges 56 and 58 and positioned in substantially parallel relationship thereto. As shown in FIG. 2, support flanges 60 and 62 extend inwardly only a relatively small distance from the opposite outer edges of platform 38.

A first pair of support shafts 64, 66 extend between flange 58 and respective ones of flanges 60 and 62 being positioned adjacent the upper outer corners thereof. A second pair of support shafts 68, 70 extend between flange 56 and the other of respective ones of flanges 60 and 62 being positioned in substantially parallel but laterally inwardly spaced relationship to shafts 64 and 66 respectively. It should be noted that while the two pairs of shafts are disclosed above as being laterally offset, it is possible to position these shafts in axially aligned relationship or to substitute a single pair of shafts therefor.

A first connecting rod 72 is pivotably supported on shaft 66 adjacent flange 62 extending downwardly and inwardly therefrom. A second connecting rod 74 also is pivotably supported on shaft 66 in spaced relationship to rod 72 by a pair of spaced arms 76 and 78 with arm 78 being located adjacent flange 58. The lower ends of arms 76 and 78 are interconnected and a shaft 80, which extends between the interconnected lower ends of arms 76 and 78 and the lower end of rod 72 and is rotatably supported thereby. Three additional rods 82, 84 and 86 which are all substantially identical to rod 72 are provided each being pivotably supported on shafts 64 and 68 immediately adjacent flange 60 and the third being pivotably supported on shaft 70 immediately adjacent flange 62. Also, three additional rods 88, 90 and 92, which are all substantially identical to rod 74, are provided one each being pivotably supported on shafts 64 and 68 adjacent respective flanges 58 and 56 and the third being pivotably supported on shaft 70 adjacent flange 56. Suitable shafts 94, 96, and 98 which are substantially identical to shaft 80 are pivotably supported by rods 82, 88;

84, 90; and 86, 92 respectively. Preferably rods 72, 74, 82, 84, 86, 88, 90 and 92 will all be supported on their respective shafts by low friction bearings. Similarly, shafts 80, 94, 96 and 98 will be rotatably supported by respective rods via low friction bearings. The use of low friction bearings is desired so as to minimize friction induced errors in the measurement of the forces generated by the wheel/tire assembly. Shafts 80, 94, 96 and 98 will, of course, be suitably restrained against axial movement relative to their supporting connecting rods.

An elongated member 100 extends between and is pivotably supported by shafts 80 and 94 by suitable low friction bearings and has a pair of upstanding spaced substantially parallel flange members 102, 104 secured thereto. Flange members 102 and 104 are positioned and of a suitable height so as to enable them to rotatably support the opposite ends of roller 105 with roller 105 positioned in spaced relationship to member 100.

In similar manner, a second elongated member 106 extends between and is pivotably supported by shafts 96 and 98 by suitable low friction bearings and has a pair of upstanding spaced substantially parallel flange members 108, 110 secured thereto. Flange members 108 and 110 are positioned and of a suitable height to rotatably support opposite ends of roller 112 with roller 112 positioned in spaced relationship to member 106.

Figure 5:
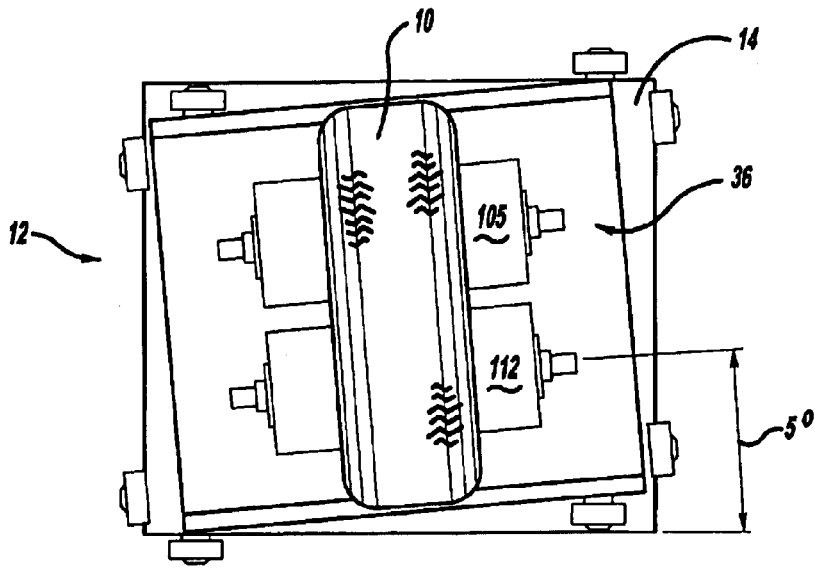
FIG. 5 is a view similar to that of FIG. 2 but showing a wheel/tire assembly exhibiting a measurable toe angle.
Figure 6:
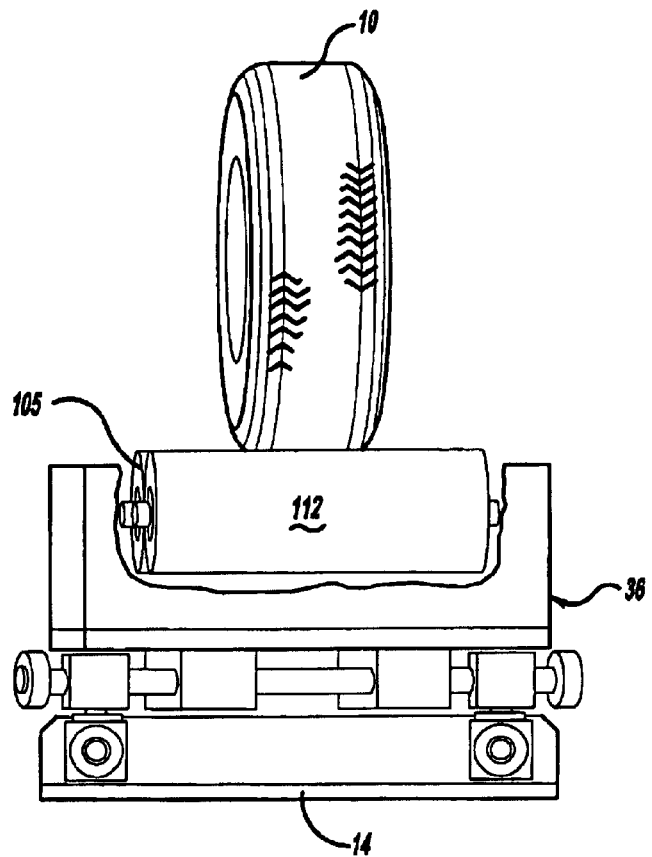
FIG. 6 is a front elevational view of the illustration shown in FIG. 5.

Preferably, as best seen in FIGS. 2 and 5, member 106 will be of a length slightly greater than the distance between supporting shafts 68 and 70 such that support rods 84, 86, 90 and 92 will extend downwardly and be angled slightly outwardly. Also, member 100 will be of a length substantially identical to that of member 106 and because supporting shafts 64 and 66 are positioned outwardly from shafts 68 and 70, support rods 72, 74, 82 and 88 will extend downwardly and be angled slightly inwardly. Preferably, one of rollers 105 and 112 will be rotatably driven in a suitable manner such as via an internal motor drive arrangement whereas the other roller will be free to rotate. However, if desired, both rollers may be powered. It should also be noted that, if desired, rods 72, 74, 82, and 88 may be positioned so as to extend substantially vertically when at rest rather than being angled as described above.

When the apparatus of the present invention is utilized to determine the forces exerted by an individual wheel/tire assembly, the vehicle wheel/tire assembly 110 is positioned so it is rotatably supported by rollers 105 and 112 whereupon the power driven roller will be actuated to thereby rotatably drive the wheel/tire assembly 10. As wheel/tire assembly is rotatably driven, the presence of any ply-steer or conicity will result in the generation of lateral forces between the wheel/tire assembly 10 and rollers 112 and 105. In this measurement use of the apparatus, the wheel/tire assembly will preferably be rotatably supported on a spindle which is accurately aligned relative to the rotational axis of rollers 105 and 112 so as to eliminate any toe forces being exerted on the rollers in which case roller support frame 36 may be locked against movement along the X or Y axis. Preferably, the wheel/tire support apparatus will exert a downward force on the wheel/tire assembly to simulate actual loading of the tire against rollers 105, 112 to thus more accurately simulate use on a vehicle.

Referring now to FIG. 5, there is illustrated the general orientation of the apparatus of the present invention when subject to a wheel/tire assembly exhibiting a 5° toe angle. As shown therein, roller support frame 36 will have rotated by the number of degrees of toe angle with respect to support base 14 while rollers 105 and 112 remain substantially centered with respect thereto and with their axis of rotation substantially parallel to the axis of rotation of the wheel/tire assembly. Note this assumes that the given wheel/tire assembly does not exhibit any lateral forces from conicity, ply-steer or camber but rather only forces resulting from toe in. Thus, by incorporating suitable sensors to measure the travel of the linear bearings along the respective shafts, the toe angle and direction may be easily determined based upon the relative displacement of the roller support platform with respect to the support base. It should be noted that the sensors utilized should preferably be of a type so as to avoid exerting any reactionary force against the free movement of roller support frame 36 so as to avoid any potential error in the measurement of the forces exerted by the wheel/tire assembly. For example, suitable non-tactile sensors such as optical sensors, or suitable proximity sensors may be utilized.

Figure 7:
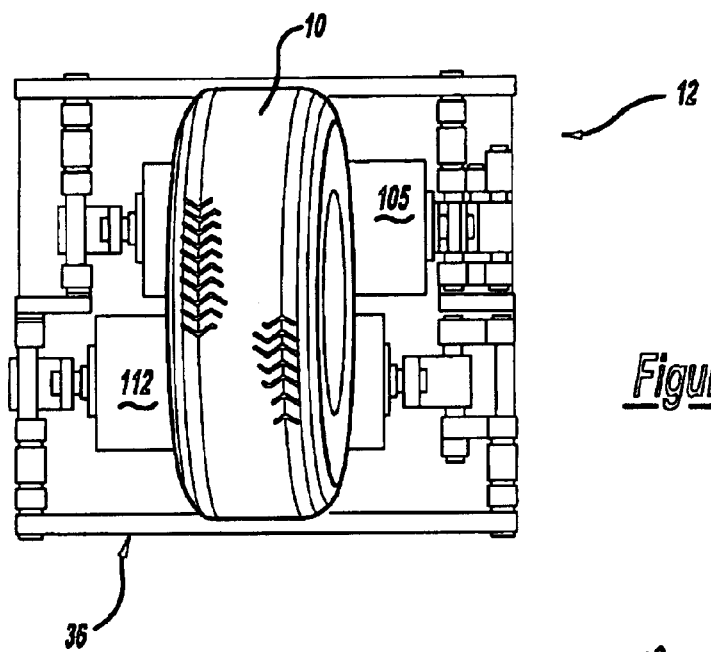
FIG. 7 is a view similar to that of FIGS. 2 and 5 but illustrating a wheel/tire assembly exhibiting a measurable camber.
Figure 8:
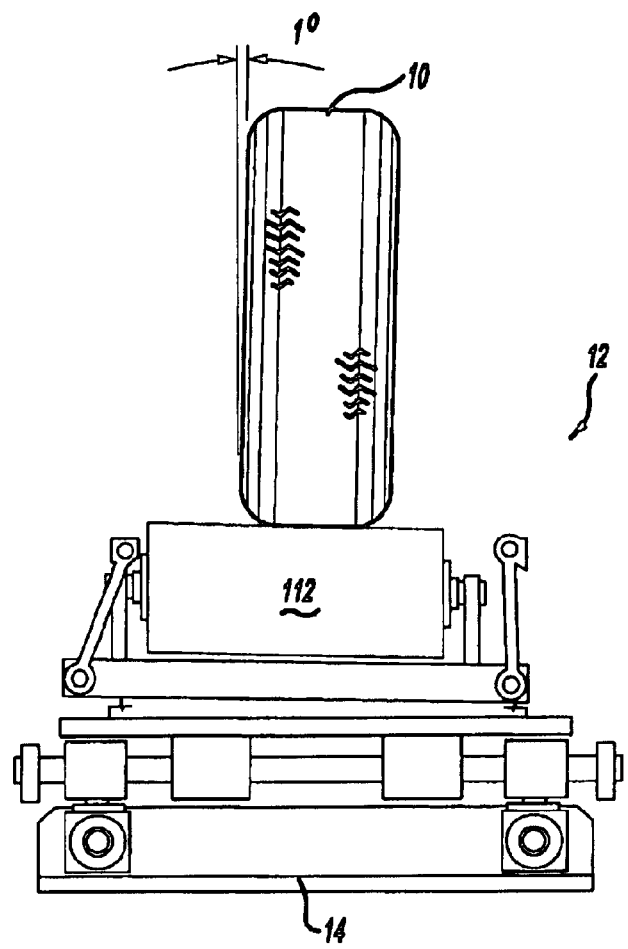
FIG. 8 is a front elevational view of the illustration shown in FIG. 7.

Referring now to FIGS. 7 and 8, a wheel/tire assembly exhibiting a 10 camber offset is shown. As seen in these figures, this camber offset will result in the wheel/tire assembly exerting lateral forces on the roller assemblies such that the lead roller 105 will be laterally displaced to the right as shown and the trailing roller assembly 112 will be displaced an equal amount to the left. Suitable sensors will detect and measure this displacement from the at rest condition thus providing a measurement indicative of the camber offset and its direction so that it may then be corrected by normal alignment adjustments in a conventional manner. Please note that as with the toe angle described above, the camber illustration assumes that that 1° camber offset is the only factor contributing to lateral forces acting on the vehicle wheel/tire assembly. As mentioned above with respect to measurement of the displacement of roller support frame 36, the sensors utilized to measure the displacement of rollers 105, 112 will preferably be of a type so as to avoid exerting any reactionary force against the free movement of the respective rollers so as to avoid introduction of errors in the measurement of the wheel/tire generated forces. The sensors may operate to measure the degrees of displacement of the supporting connecting rods about their shafts or preferably the actual lateral or arcuate distance displacement.

Turning now to the various dynamic forces encountered by a wheel/tire assembly, we shall explain the manner in which the above described apparatus may be utilized to measure these forces for a given wheel/tire assembly as well as to enable the above described apparatus to be utilized to achieve improved vehicle wheel alignment.

As mentioned above, there are two primary factors that contribute to the generation of lateral dynamic forces in a wheel/tire assembly, namely conicity and ply-steer. Both of these factors result from variations in the tire manufacturing process and hence will typically vary from one tire to another. It should again be noted that there are other geometrical factors which also greatly affect such lateral forces such as camber and toe in associated with the specific vehicle discussed above. However, these geometrical factors are generally measured by and used for wheel/tire alignment in conventional apparatus. This conventional apparatus, however, has heretofore not been successful in being able to accurately measure and thus allow for compensatory adjustments for the above mentioned dynamic forces.

Ply-steer results from the angle of belt plies with respect to the centerline of the tire and operates to generate a lateral force which is similar in nature to the forces resulting from a slip angle (i.e. the angle between the plane of the tire and the direction of travel of the tire over the road surface). For this reason, ply-steer is sometimes referred to as pseudo slip angle.

Figure 9:
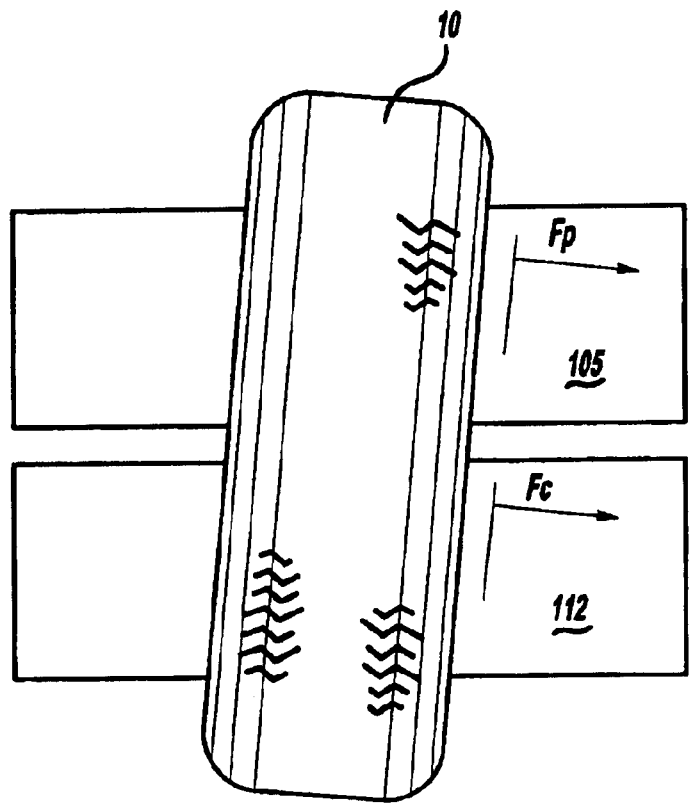
FIG. 9 is a diagrammatic view of a wheel/tire assembly demonstrating the effect of steer force.

In any event, as illustrated in FIG. 9, the ply-steer in a given wheel/tire assembly will result in a lateral force causing the vehicle to move in a direction at an angle to the plane in which it is rotating. As diagrammatically shown in FIG. 9, these lateral forces will result in relative movement of the roller support frame 36 with respect to the supporting base such that the rotational axis of rollers 105, 112 will no longer be parallel to the rotational axis of the wheel/tire assembly. The sensors incorporated in the apparatus of the present invention will provide an indication of the magnitude and direction of this movement and hence the ply-steer generated lateral forces. From this measurement, appropriate corrective action may be taken to adjust the vehicle alignment so as to compensate for the ply-steer generated lateral forces.

Figure 10:
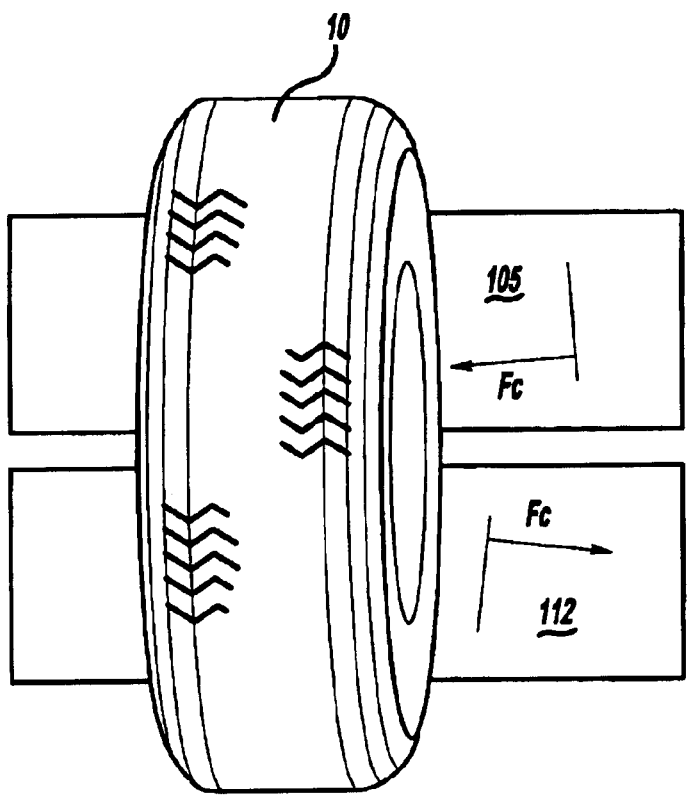
FIG. 10 is a diagrammatic view of a wheel/tire assembly demonstrating the effect of steer forces resulting from camber.

Conicity also results in a lateral force being exerted on the rollers by the wheel/tire assembly. Conicity is generally a result of the tire belting being placed slightly off center in the construction of the tire. As shown in FIG. 10, conicity generates lateral forces on rollers 105 and 112 which act in opposite directions similar to that of camber. The conicity generated lateral forces will result in opposite lateral displacement of rollers 105 and 112 which displacement may be measured by sensors associated with the supporting rods. Once this force and its direction is measured, suitable adjustments in the vehicle alignment may be made in a conventional manner to compensate for this force.

It should be noted that the design of the tire force measurement system of the present invention eliminates the need for active lateral constraints such as side rollers or the like to prevent movement of the tire off the edge of the rollers. This is particularly advantageous in that the elimination of such lateral constrains eliminates errors in measurement of the forces generated by the wheel/tire assembly during the alignment process thus assuring a more accurate alignment. This self-centering feature offered by the present invention is diagrammatically illustrated in FIG. 11. As shown therein, the wheel/tire assembly 10 exerts a laterally directed force $F_y$ on the roller 112. This force $F_y$ results in the roller moving to the left as shown therein. Because the rods supporting the rollers at opposite ends thereof are not parallel to each other but rather are angled outwardly as they extend downwardly from their respective support shafts movement of the roller to the right as shown will result in the right end of the roller moving to a lower elevation while the left end of the roller moves to a higher elevation. This tipping action of the roller generates a force $F_r$ acting on the wheel/tire assembly in the opposite direction of the force $F_y$. As the angulation of the roller relative to the horizontal increases, this restoring force $F_r$ will increase in magnitude until it reaches a point at which it is in equilibrium with the tire generated force $F_y$. Thus, this self-generated restoring force eliminates the need for active lateral constraints that may introduce erroneous force measurements and result in less than optimal alignment. As may be appreciated, the degree of angulation of the rods will preferably be selected so as to provide the desired range of restoring force necessary for a given application. That is, the angulation may be increased to generate an increased restoring force. Alternatively, the length of the connecting rods may also be increased to generate an increased restoring force.

While, as described above, the present invention is designed to afford a self-generated restoring force to eliminate the need for lateral restraints, it may still be desirable to include what may be termed passive lateral restraint rollers to accommodate an unexpected extreme situation in which the tire generated lateral forces exceed the maximum restoring force that can be generated.

Figure 12:
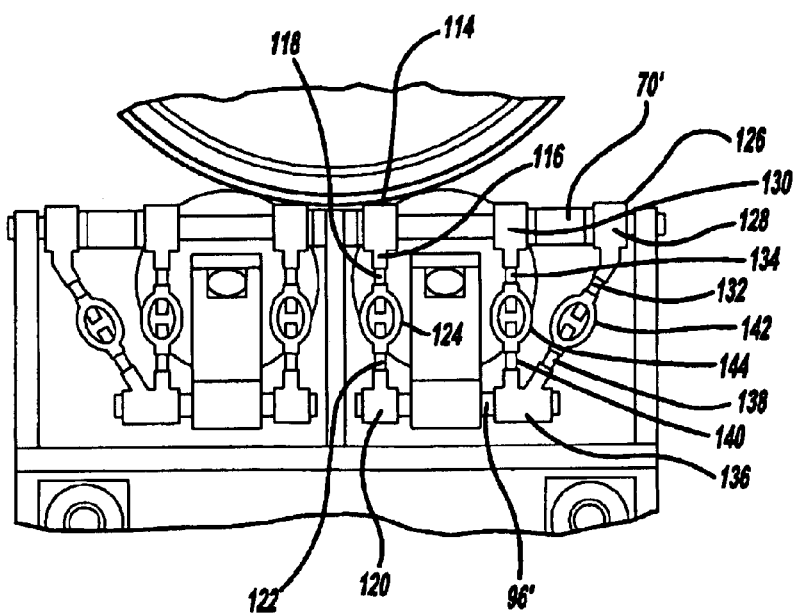
FIG. 12 is a view similar to that of FIG. 3 but illustrating a modified embodiment of the present invention.

As noted above, in some applications, it may be desirable to provide adjustable length connecting rods for supporting the tire engaging rollers so as to enable a greater maximum restoring force to be provided for a selected application. As shown in FIG. 12, this may be easily accommodated by incorporating a threaded turnbuckle into the shaft thereof. Connecting rod 114 comprises an upper portion 116 pivotably supported on shaft 70' and having a depending arm portion 118 threaded along its length. Similarly, connecting rod 114 includes a lower portion 120 having one end pivotably connected to shaft 96' and an upstanding arm portion 122 also threaded along its length. A turnbuckle 124 is threadedly connected to each arm portion 118 and 122 such that by rotation of turnbuckle 124, the effective length of connecting rod 114 may be varied between a predetermined minimum and maximum. Connecting rod 126 includes first and second upper portions 128, 130 each pivotally connected to shaft 70' and having depending arm portions 132, 134 respectively threaded along their length. Connecting rod 126 also includes a lower portion 136 having a pair of upstanding arm portions 138, 140 each of which is threaded along its length. A pair of turnbuckles 142, 144 serve to threadedly interconnect respective arm portions 132, 138 and 134, 140. However, because the relative angulation of arm portion 132 with respect to shaft 70' will change as the length of connecting rod 126 is changed, it will be necessary to incorporate a spherical bearing at its interconnection with shaft 70'. Similarly, it may also be necessary to incorporate a spherical bearing at the interconnection of lower portion 136 with shaft 96' to assist in accommodating the change in angulation of upper and lower arm portions 132 and 138 with the change in length. Alternatively, a pivot connection could be utilized on arm 132 adjacent its juncture with shaft 70' and on arm 138 at its juncture with shaft 96'. In like manner, each of the other sets of connecting rods will be substantially identical to connecting rods 114 and 126 described above.

In order to adjust the length thereof, one merely needs to rotate each of the turnbuckles a given amount to either increase or decrease the length of the respective connecting rods. It should be noted that it is desirable to ensure that each of the connecting rods is lengthened or shortened a like amount to ensure proper orientation of the supporting roller.

Figure 13:
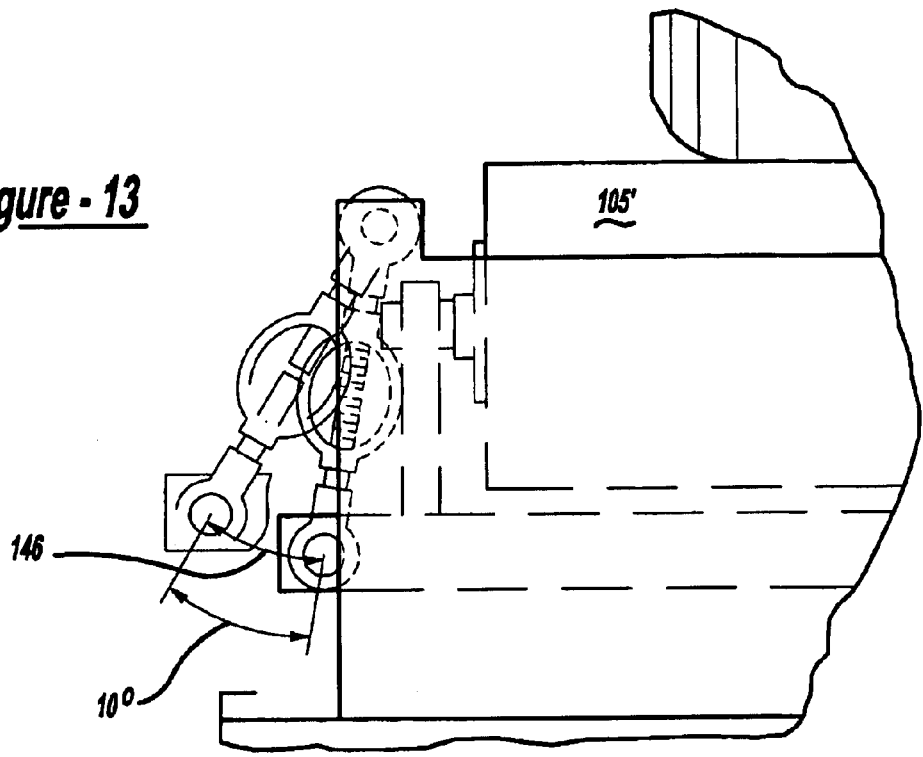
FIGS. 13 and 14 are diagrammatical views illustrating the variance in sensitivity afforded by the embodiment shown in FIG. 12.
Figure 14:
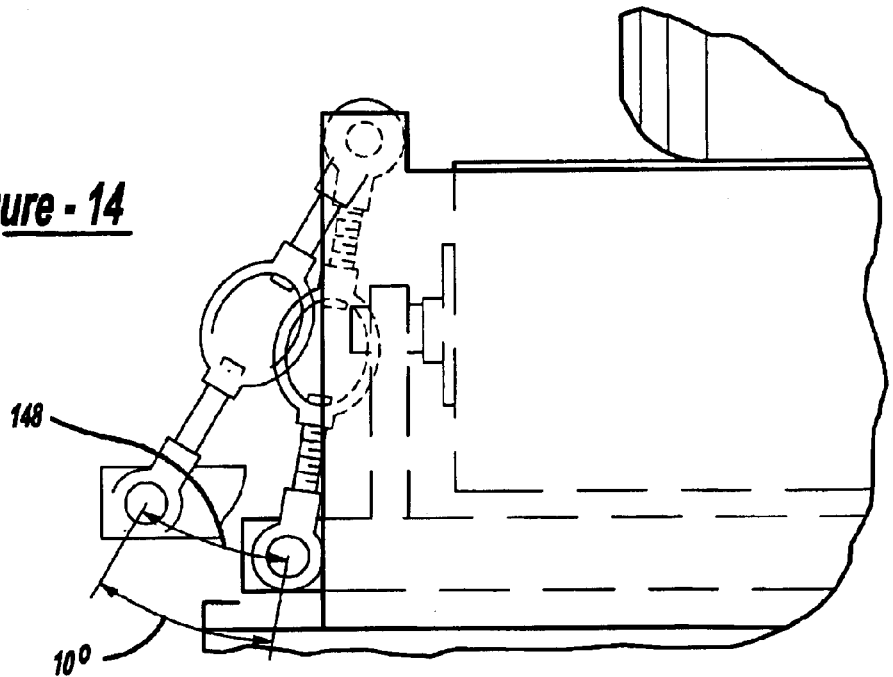
Figure 15:
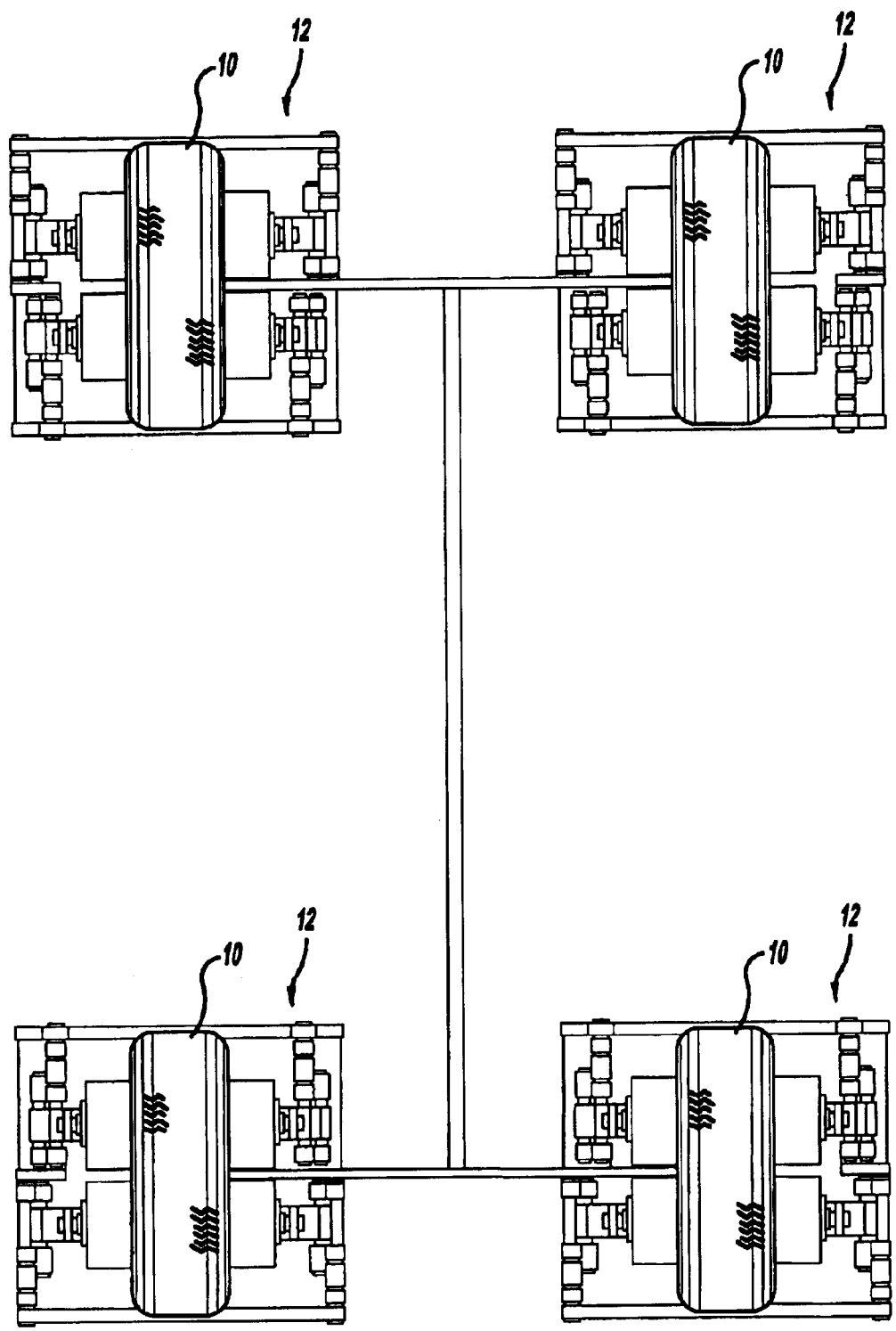
FIG. 15 is a diagrammatic view of the apparatus of the present invention utilized in a vehicle wheel alignment application.

An added benefit provided by increasing the length of the connecting rods is illustrated in FIGS. 13 and 14. As will be seen therein, as the length of the connecting rods are increased, the actual distance traveled by the supporting roller as a result of the lateral force exerted thereon by the wheel/tire assembly will progressively increase. For example, in FIG. 13, a given lateral angular displacement of 100 of roller 105' will result in a total displacement X as measured along curve 146 for a given length of connecting rod. In FIG. 14, the length of the connecting rods have been increased with the result that the total displacement along curve 148 is now X+Y for the same degrees of angular movement. This greater distance of movement for a given force enables a greater degree of precision in the measurement of these lateral forces.

As may now be appreciated, because both rollers are supported for independent movement with respect to each other and are also supported for rotational movement about the Z axis, they are able to react to virtually all forces exerted thereby by the wheel/tire assembly. This then enables sensors to determine the extent and direction of the displacement such that compensating adjustments to the vehicle suspension components may be made to minimize the steering torque required to maintain a straight line of travel. It should be noted that when the apparatus is used for alignment of the wheels mounted on a motor vehicle, the alignment adjustments may not be able to fully compensate for these lateral forces on a single wheel/tire assembly. In such cases, the wheel/tire assembly on the opposite lateral side of the vehicle may be adjusted to generate an equal lateral force acting in the opposite direction so as to thereby effectively nullify the resultant lateral forces acting on a front or rear axle of the vehicle.

Figure 11:
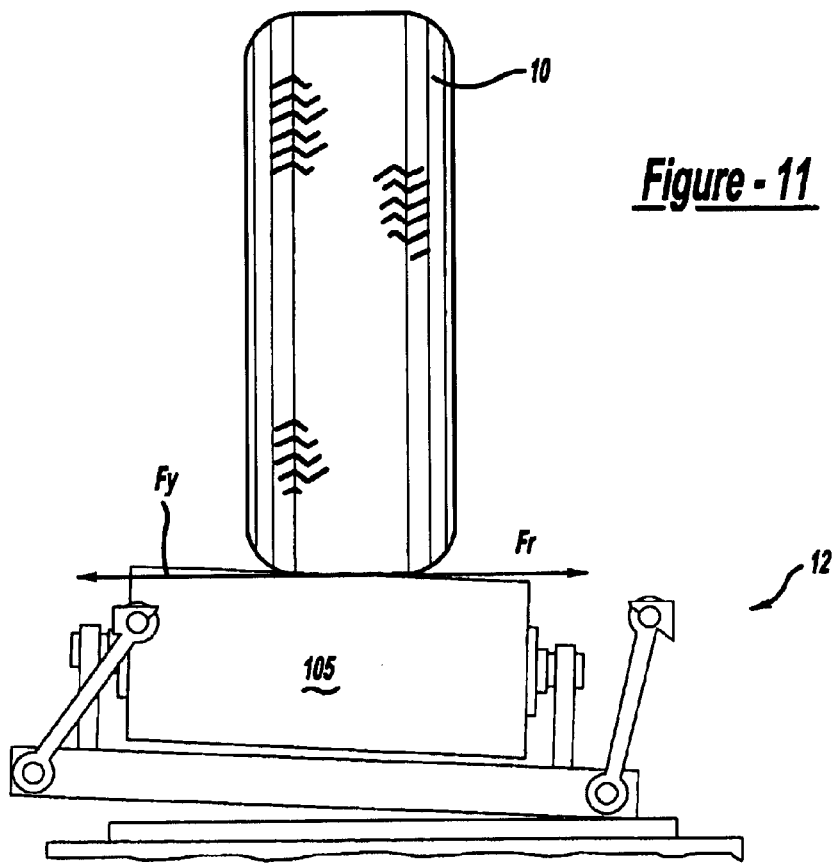
FIG. 11 is a diagrammatic view illustrating the active force exerted by the wheel/tire assembly on a roller assembly of the present invention and the reactive force exerted on the wheel/tire assembly by the roller assembly.

It should be noted that when the present invention is utilized for aligning wheel/tire assemblies mounted on a given vehicle, each tire will be supported by and exert its forces on a separate roller assembly as shown schematically in FIG. 11. Further, the vehicle will preferably be free to interact with the respective tire force measurement apparatus without engaging lateral restraint apparatus so as to enable the apparatus to provide an accurate indication of the roller tire forces.

While the wheel/tire force measurement apparatus of the present invention has been described above in a motor vehicle alignment application, it may also be utilized in applications for measuring the lateral forces generated by specific tires. In such an application, only the forces resulting from ply-steer and conicity would generally be measured as the standardized test setup will generally be adjusted to eliminate forces resulting from toe angles and/or camber. The measurement apparatus of the present invention may also be utilized to facilitate matching of tires to a given vehicle axle. For example, by selecting tires generating approximately equal lateral forces in opposite directions and placing these tires on opposite ends of the same axle, only relatively minor adjustments need be made to the vehicle alignment to net these forces to substantially zero for the given axle.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. A tire force measurement system comprising:
   a supporting base:
   a roller support assembly supported on said support base, said roller support assembly including a pair of rollers for rotatably supporting a vehicle tire thereon, each roller being independently supported for movement in a direction parallel to a first plane in response to forces exerted thereon by said tire as said tire is rotated;
   sensors associated with said rollers to provide a measurement of the direction and magnitude of a lateral force, in a direction parallel to a rotational axis of said tire, exerted thereon by said tire; and
   wherein said roller support assembly includes a pair of support shafts positioned adjacent opposite ends of said rollers and connecting rods having one end pivotally supported on said support shafts, the other end of said connecting rods movably supporting said rollers.

2. A tire force measurement system as set forth in claim 1 wherein at least one of said rollers is operative to rotatably drive said vehicle tire.

3. A tire force measurement system as set forth in claim 1 wherein said first plane extends substantially parallel to the axis of rotation of said vehicle tire.

4. A tire force measurement system as set forth in claim 1 wherein said connecting rods extend downwardly from said pair of support shafts and are angled outwardly with respect to the plane of rotation of said tire.

5. A tire force measurement system as set forth in claim 4 wherein the length of each of said connecting rods is adjustable.

6. A tire force measurement system as set forth in claim 1 wherein said roller support assembly is movably supported on said supporting base for movement in a second plane.

7. A tire force measurement system as set forth in claim 6 wherein said second plane is perpendicular to said first plane.

8. A tire force measurement system as set forth in claim 1 wherein each of said rollers is movable along an arc.

9. A tire force measurement system as set forth in claim 8, wherein said vehicle tire exerts a tire force on said rollers acting in a direction parallel to the axis of rotation of said vehicle tire and each of said rollers exerts a reactionary restoring force on said vehicle tire action in a friction opposite to that of said tire force, the magnitude of said reactionary restoring force varying with the degree of movement of said roller along said arc.

10. A tire force measurement apparatus comprising:
    a supporting base;
    a first pair of elongated shafts supported in substantially parallel spaced relationship on said supporting base;
    first and second pairs of linear bearing assemblies longitudinally movably supported on respective ones of said first pair of shafts;
    a roller support assembly including a base;
    a second pair of elongated shafts supported in substantially parallel spaced relationship on said base;
    third and fourth pairs of linear bearing assemblies longitudinally movably supported on respective ones of said second pair of elongated shafts, said third pair of linear bearing assemblies being pivotably secured to respective ones of said first pair of linear bearing assemblies and said fourth pair of linear bearing assemblies being pivotably secured to respective ones of said second pair of linear bearing assemblies whereby said base is supported on said supporting base for movement along a first axis extending parallel to said first pair of shafts and a second axis extending parallel to said second pair of shafts, said first and second axis lying in a substantially horizontal plane and being in non-parallel relationship;
    a first roller rotatably supported on said base and having an axis of rotation extending parallel to one of said first and second axis;
    a second roller rotatably supported on said base in spaced substantially parallel relationship to said first roller;
    said first and second rollers each being independently movable about an arcuate path extending in the direction of said axis of rotation;
    said first and second rollers being adapted to rotatably support a vehicle tire thereon, said vehicle tire exerting a force on one or both of said first and second rollers to effect movement of said first and second rollers along said arcuate path;
    lateral force sensors operatively associated with said rollers to sense the direction and magnitude of said movement along said arcuate path to thereby provide a measurement of the lateral forces generated by rotation of said vehicle tire.

11. A tire force measurement apparatus as set forth in claim 10 further comprising second sensors for sensing the direction and magnitude of movement of said base with respect to said supporting base to thereby provide a measurement of the slip angle generated by rotation of said vehicle tire.

12. A tire force measurement apparatus set forth in claim 11 further comprising an elongated roller base, said first roller being rotatably supported on said roller base, and connecting rods at opposite ends of said roller base for supporting said roller base for movement along said arcuate path with respect to said base.

13. A tire force measurement apparatus as set forth in claim 12 further comprising first and second connecting rod shafts supported in overlying relationship to said base adjacent opposite longitudinal ends of said roller base, said connecting rods each having one end pivotably connected to said roller base and the other ends pivotably connected to said first and second connecting rod shafts.

14. A tire force measurement apparatus as set forth in claim 13 wherein said connecting rods include first and second substantially identical connecting rods positioned at opposite ends of said roller base and third and fourth substantially identical connecting rods positioned at opposite ends of said roller base.

15. A tire force measurement apparatus as set forth in claim 14 wherein said third and fourth connecting rods each include first and second elongated arm portions, said first and second arm portions defining an acute included angle.

16. A tire force measurement apparatus as set forth in claim 15 wherein the length of said first and second arm portions is adjustable.

17. A tire force measurement apparatus as set forth in claim 15 wherein said first and second connecting rods each include a third arm portion, the length of said third arm portion being adjustable.

18. A method of measuring the dynamic forces generated by a rotating vehicle tire comprising:

rotatably supporting said vehicle tire on a pair of parallel spaced rollers, each of said rollers being independently movable along an arcuate path lying parallel to a plane extending parallel to the axis of rotation of said rollers, driving one of said rollers to thereby rotatably drive said vehicle tire;

measuring the direction and magnitude of movement of each of said pair of rollers along said arcuate path as said vehicle tire is rotatably driven to thereby determine lateral forces, in a direction parallel to a rotational axis of said tire, generated by said tire due to conicity and camber, wherein said pair of rollers is further supported for rotational movement about a substantially vertical axis, said method comprising measuring the movement about said vertical axis to determine the magnitude of ply-steer forces generated by said tire.

\* \* \* \* \*

UNITED STATES PATENT AND TRADEMARK OFFICE
CERTIFICATE OF CORRECTION

PATENT NO.   : 6,739,185 B2
DATED         : May 25, 2004
INVENTOR(S)  : Schoeninger It is certified that error appears in the above-identified patent and that said Letters Patent is hereby corrected as shown below:

Column 6,
Line 19, "10" should be -- 1º --.

Column 8,
Line 55, "100" should be -- 10º --.

Signed and Sealed this

Twelfth Day of April, 2005

JON W. DUDAS
*Director of the United States Patent and Trademark Office*